UNITED STATES PATENT OFFICE.

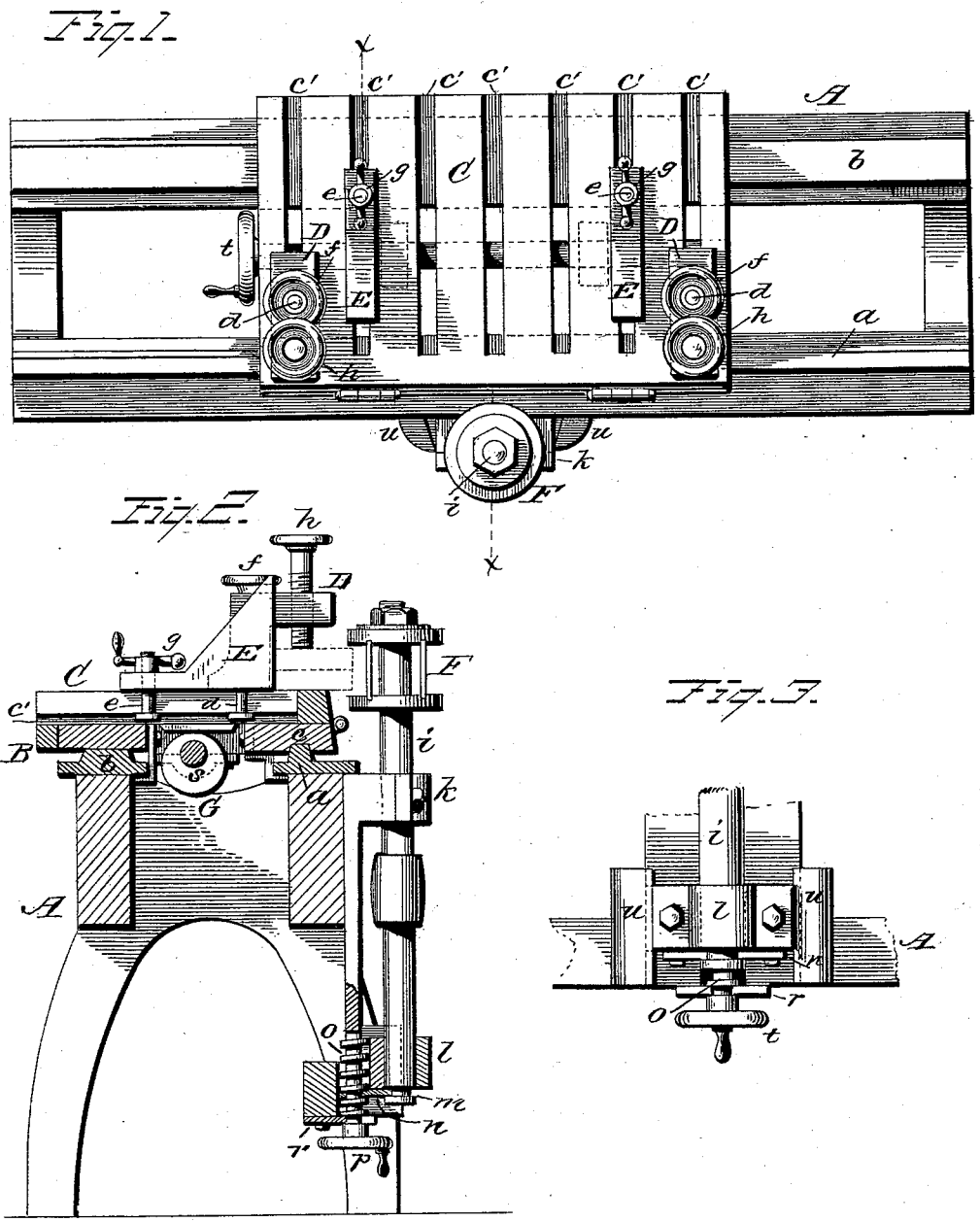

WELLINGTON L. PARMELEE, CHARLES H. BARKER, AND EGBERT B. PARMELEE, OF CHESTER, CONNECTICUT.

WOODWORKING-MACHINE.

SPECIFICATION forming part of Letters Patent No. 534,661, dated February 26, 1895.

Application filed December 13, 1894. Serial No. 531,634. (No model.)

*To all whom it may concern:*

Be it known that we, WELLINGTON L. PARMELEE, CHARLES H. BARKER, and EGBERT B. PARMELEE, citizens of the United States, residing at Chester, in the county of Middlesex and State of Connecticut, have invented certain new and useful Improvements in Woodworking-Machines; and we do hereby declare that the following is a full, clear, and exact description of the same, reference being had to the annexed drawings, making a part of this specification, and to the letters of reference marked thereon.

The present invention has for its object to provide a machine for preparing the edges of boards whereby a perfect and close joint will be obtained when the edges of the boards are brought in contact in carpentry and building and for other purposes, also enabling the same machine to be used in beveling the edges of the boards, thus providing for a straight or bevel joint.

The invention consists in a machine constructed substantially as shown in the drawings and hereinafter described and claimed.

Figure 1 of the drawings represents a top plan view of the machine constructed in accordance with our invention; Fig. 2, a transverse vertical section taken on line $xx$ of Fig. 1; Fig. 3, a detail plan view of the means employed for raising or lowering the cutter-shaft.

In the accompanying drawings A represents a suitable frame of rectangular shape provided upon its upper side with guide-rails $a\ b$ for guiding a suitable carriage B. This carriage has a groove $c$ upon its under side to fit over the track $a$ while the rail $b$ simply forms a support for the carriage, the rail and groove in which it fits retaining the carriage in position on the frame A. To the carriage B is hinged a table C having a plurality of parallel T-shaped slots $c'$ to receive suitable clamps D and gages E to enable them to be horizontally adjustable transversely of said table. These clamps and gages may be of any suitable and well known construction and provided with suitable means for holding them in their adjusted position. There is shown however one of many means that may be employed for the purpose of adjustment and holding the clamps and gages in the position adjusted, which consists in the present instance of headed screw bolts $d\ e$ on the clamps and gages respectively. The heads of these bolts fit in the T-shaped slots $c'$ and extend up through holes in the clamps and gages and have their ends screw threaded to receive hand wheels, thumb-nuts or other like devices $f\ g$ respectively.

The gages E bring the edges of the boards on line with each other as shown in dotted lines of Fig. 2, and the clamp-screws $h$ of the clamps hold the boards securely together and in position so that the opposite edges of the boards will be operated upon by the revolving cutter F, which cutter may be of any suitable construction. The cutter F is suitably connected to the upper end of a shaft $i$ and may be rotated by a belt, gearing, or any of the means usually employed for the purpose. The shaft $i$ has its bearings in a stationary box $k$ and a movable box $l$, the lower end of the shaft having a circumferential groove $m$ with which a plate $n$ engages to hold said shaft in engagement with the box $l$ and admit of its revolution. This plate $n$ is secured to the under side of the box $l$ and engages an adjusting screw $o$ which is provided with a hand-wheel $p$ for turning it. When the screw is turned in the proper direction, through its connection with the plate upon the under side of the box, said box will be raised or lowered as the case may be and carry with it the shaft of the cutter. The height of the cutter may thus be regulated to adapt it to the position of the boards, the adjusting screw hereinbefore described being held to the frame A by means of a slotted plate $r$.

When it is desired to bevel the edges of the boards, the hinged table C is brought to an incline by means of one or more cams G upon a shaft $s$, said shaft being turned by means of a hand-wheel $t$ or by any other suitable device. The cam or cams bear against the under side of the hinged table and will raise it at the desired angle to give the necessary bevel to the edges of the board to form a proper and close fitting joint. It will therefore be seen that by one and the same machine provision is made for giving a straight edge to the boards or any desired degree of bevel and when two boards are placed together as indicated in dotted lines of Fig. 2, the same are simultaneously operated on by the revolving cutter and the edges of both boards dressed exactly alike so that when the edges meet a close and perfect joint will be obtained.

The movable box $l$ is steadied in its movement by means of guides $u$ secured to the frame of the machine.

Having now fully described our invention, what we claim as new, and desire to secure by Letters Patent, is—

A machine for dressing the edges of boards to form a straight or bevel joint, consisting of a suitable frame provided with guide rails, a carriage engaging with the rails, a table hinged to said carriage, adjustable gages and clamps upon the table, means for raising said table to an angle, and a cutter mounted on a rotatable shaft, and means for raising and lowering the shaft, consisting of an adjustable box, an adjusting screw, a plate connected to the box and engaging with the grooved end of the shaft and the screw, substantially as and for the purpose described.

In testimony that we claim the above we have hereunto subscribed our names in the presence of two witnesses.

WELLINGTON L. PARMELEE.
  CHARLES H. BARKER.
  EGBERT B. PARMELEE.

Witnesses:
  JONATHAN T. CLARKE,
  E. W. SMITH.